United States Patent
Bennett et al.

(10) Patent No.: US 7,127,337 B2
(45) Date of Patent: Oct. 24, 2006

(54) SILENT OPERATING MODE FOR REDUCING EMISSIONS OF A HYBRID ELECTRIC VEHICLE

(75) Inventors: Adam C. Bennett, McCordsville, IN (US); William R. Cawthorne, Milford, MI (US); Tung-Ming Hsieh, Carmel, IN (US); Gregory A. Hubbard, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 99 days.

(21) Appl. No.: 10/686,175

(22) Filed: Oct. 14, 2003

(65) Prior Publication Data

US 2005/0080523 A1   Apr. 14, 2005

(51) Int. Cl.
  *B60R 16/03*  (2006.01)
  *B60K 1/00*  (2006.01)
(52) U.S. Cl. .................. 701/22; 180/65.1; 318/139
(58) Field of Classification Search .................. 701/22, 701/25, 26, 201; 180/65.1, 65.3, 65.4, 65.5, 180/65.8, 53.5; 318/139; 475/5
See application file for complete search history.

(56) References Cited

U.S. PATENT DOCUMENTS

| 5,606,946 | A  | * | 3/1997  | Data et al. ................ 123/198 F |
| 5,704,440 | A  | * | 1/1998  | Urban et al. ................ 180/65.2 |
| 5,842,534 | A  | * | 12/1998 | Frank ......................... 180/65.2 |
| 5,931,757 | A  |   | 8/1999  | Schmidt |
| 6,360,834 | B1 | * | 3/2002  | Gauthier ..................... 180/65.2 |
| 6,554,088 | B1 | * | 4/2003  | Severinsky et al. ........ 180/65.2 |
| 6,721,637 | B1 | * | 4/2004  | Abe et al. ..................... 701/22 |

\* cited by examiner

*Primary Examiner*—Dalena Tran
(74) *Attorney, Agent, or Firm*—Christopher DeVries

(57) ABSTRACT

This novel silent operating mode for a hybrid electric vehicle (HEV) reduces noise and emissions compared to traditional HEV operating modes. It is a complementary series of software control functions that allows the vehicle to operate with reduced noise and emissions where specifically needed, while phasing-in engine power where allowed. The method utilizes an energy storage system budget associated with a modal quantity of energy allocated for the mode, and is adapted to automatically adjust the operation of the vehicle to accommodate deviations from the budgeted energy amount. The mode also adjusts the vehicle operation in conjunction with changes in the parametric conditions of the ESS.

17 Claims, 9 Drawing Sheets

SILENT OPERATING MODE FOR REDUCING EMISSIONS OF A HYBRID ELECTRIC VEHICLE

CROSS-REFERENCE TO RELATED APPLICATIONS

This patent application is related to commonly assigned, co-pending U.S. patent application Ser. No. 10/686,015.

TECHNICAL FIELD

This invention generally comprises a method for implementing a silent mode of operating a hybrid electric vehicle (HEV) so as to reduce the noise and exhaust emissions of the vehicle. More specifically, the silent mode is a method of operating an HEV in a target area so as to preferentially use an electric drive motor driven by an energy storage system for vehicle propulsion rather than an engine, such as an internal combustion engine. Most specifically, the silent mode is a method of automatically operating an HEV in a target area where an electric drive motor driven by the energy storage system is designated as the primary source of propulsion energy, and the engine is used only to make up a balance of the total propulsion energy demand that exceeds an energy budget of the electric drive motor/ESS.

BACKGROUND OF THE INVENTION

An HEV is a vehicle that has a propulsion system that consists of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Various hybrid powertrain architectures are known for managing the input and output torques of various propulsion systems in HEVs, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack.

Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e. input split, output split and compound split configurations) thereby enabling high-torque continuously variable speed ratios, electrically dominated launches, regenerative braking, engine off idling, and two-mode operation.

The development of new HEV powertrain architectures also facilitate the development and implementation of novel vehicle operating methodologies that utilize the novel features available in these systems. New operating methods are desired that utilize HEV powertrain architectures, for example, to provide vehicle operating methodologies that are particularly adapted to their operating environments, or that meet legal, regulatory or other constraints that are imposed upon their operating environments, such as by using novel combinations of electrical and mechanical propulsion energy to minimize vehicle emissions, such as noise and exhaust emissions. It is also desirable that such operating methodologies are incorporated into the vehicle hardware and software systems as novel operating modes that are available for selection manually by an operator, or for automatic implementation by the vehicle in response to predetermined conditions.

Complex EVT HEVs utilize one or more electric machines and require advanced, high energy density, energy storage systems (ESS) which include batteries, ultracapacitors or combinations thereof, to supply electrical energy to and receive and store electrical energy from these machines. The implementation of new operating methodologies, place increased demands on the electric machines and ESS associated with the dynamic flow of power into and out of the ESS.

Therefore, it is highly desirable to develop vehicle operating methodologies that are adapted to vehicle operating environment requirements and that can be incorporated into the vehicles as operating modes that implement advance control of HEV systems, including the engine, electric machine and ESS systems.

SUMMARY OF THE INVENTION

The present invention is a method of providing a silent mode of operation for a hybrid electric vehicle having a rechargeable ESS. The method comprises a series of steps including: (1) transmitting a silent mode initiation request to a silent mode controller; (2) comparing an actual value of at least one state parameter of the ESS that is indicative of the availability of the ESS for implementing the silent mode to at least one silent mode initiation limit value associated with the actual value, wherein if the actual value of at the least one state parameter compared to the associated at least one mode initiation limit value indicates that the silent mode is allowed, the method proceeds to step (3), and wherein if the actual value of the at least one state parameter indicates that the silent mode is not allowed, step (2) is repeated so long as the silent mode initiation request is being transmitted; (3) transmitting a silent mode activation request to the silent mode controller;(4) operating the vehicle in the silent mode using the silent mode controller, comprising designating an electric drive motor as a primary source of propulsion energy for the vehicle and designating an engine as a secondary source of the propulsion energy for the vehicle, wherein a modal quantity of energy in the ESS is allocated for use by the electric drive motor during the silent mode and the engine is used to make up the difference between the modal quantity of energy and a total vehicle propulsion energy requirement during the silent mode; and (5) terminating the silent mode in response to the occurrence of a mode termination event.

The method preferably includes a precharging step to establish a desired modal quantity of battery energy for use in implementing the method.

The method also preferably utilizes a battery budget to distribute the modal quantity of battery energy allocated for implementation of the silent mode over the length of the target zone in which the mode is to be implemented. The method also preferably utilizes a method of controlling the battery budget using a battery budget factor, which compares the budgeted battery use with actual battery use in order to determine when additional propulsion energy is required from the engine.

This method provides significant and readily appreciable advantages and benefits associated with a substantial reduction of both noise and exhaust emissions within the target zone of its use.

BRIEF DESCRIPTION OF THE DRAWINGS

The present invention may be more fully understood from the detailed description given here below, the appended claims, and the accompanying drawings in which:

DESCRIPTION OF THE PREFERRED EMBODIMENT

Figure 1:
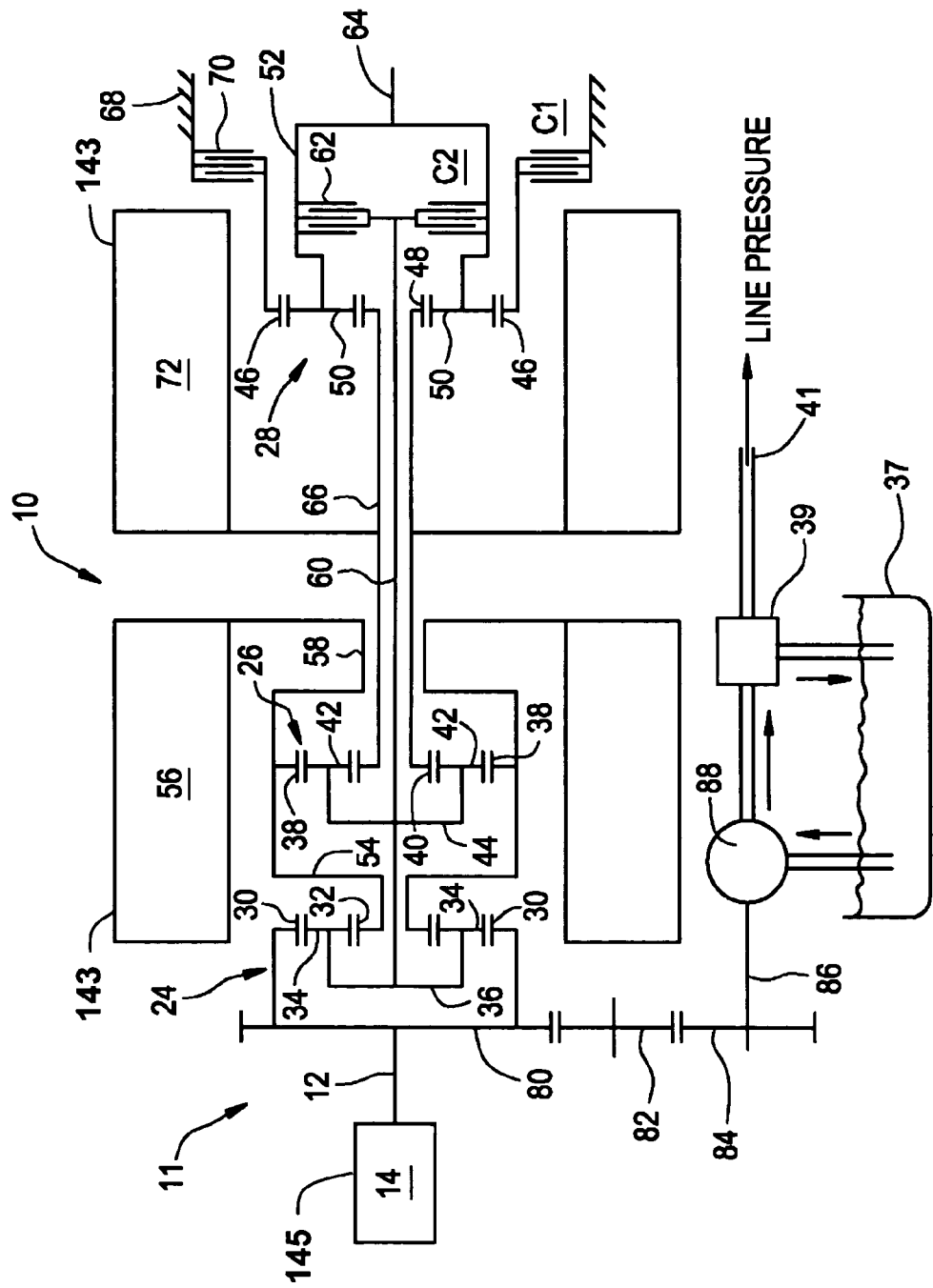
FIG. 1 is a mechanical hardware schematic representation of one preferred form of a two-mode, compound-split, electrically variable transmission particularly suited to the implementation of the present invention.
Figure 2:
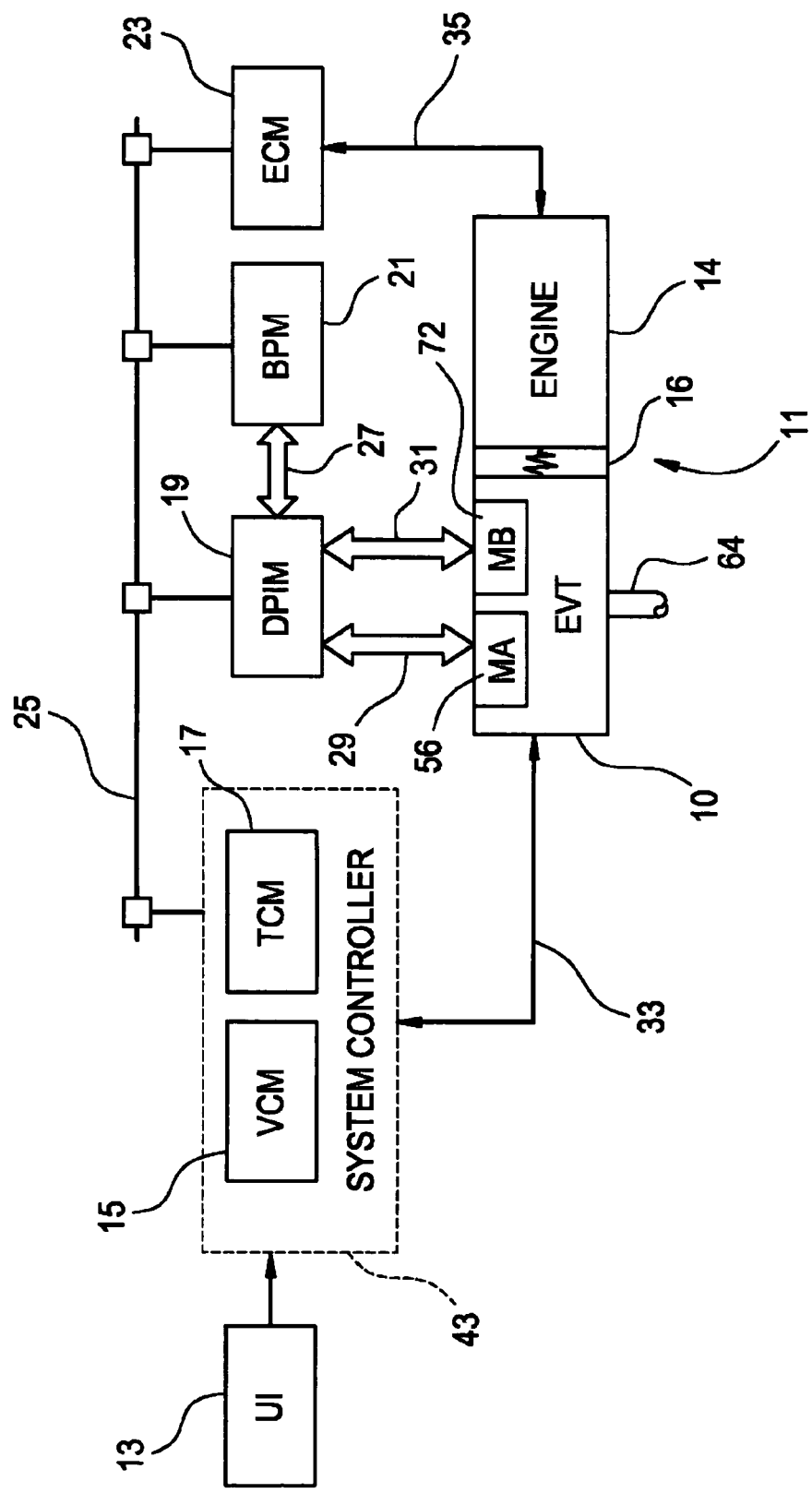
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 32 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (with the) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric energy storage device or system 20 (ESS), such as one or more batteries in battery pack module (BPM) 21. As used herein, reference to a battery includes not only a single battery, also includes any combination of single or multiple batteries, or cells thereof, into a battery pack or array, or a plurality of battery packs or arrays. BPM 21 is preferably a parallel array of battery packs, each of which comprises a plurality of batteries. As used herein, the term battery generally refers to any secondary or rechargeable battery, but those comprising lead/acid, nickel/metal hydride (Ni/NMH), or Li/ion or polymer cells are preferred. Other electric energy storage devices that have the ability to store electric power through charging and dispense electric power through discharging, such as super capacitors or ultracapacitors, may be used in place of, or in combination with, the batteries without altering the concepts of the present invention. The BPM 21 is high voltage DC (e.g., about 650 V in an exemplary embodiment) coupled to dual power inverter module (DPIM) 19 via DC lines 27. Current is transferable to or from the BPM 21 in accordance with whether the BPM 21 is being charged or discharged. BPM 21 also comprises a conventional microprocessor based controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O), temperature sensors and appropriate signal conditioning and buffer circuitry necessary to monitor the state of the battery and transmit this information to other portions of the control system for use in the overall control of the vehicle, such as VCM 15 and TCM 17. This includes sensing, processing, calculating and otherwise monitoring various parametric information regarding the state or condition of the battery, such as its temperature, current and voltage while charging and discharging, and state of charge (SOC), which comprises the instantaneous amount of energy stored in the battery expressed as a percentage of its total energy storage capacity. This also includes is a transmitting the information concerning these parameters to other portions of the vehicle control system, including the VCM 15 and TCM 17, for use in conjunction with control algorithms which make use of battery parametric information, such as those used to establish SOC-related charge and discharge limits, amp-hour/hour or energy throughput limits, temperature limits or other battery-related control functions.

DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 land provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or in conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
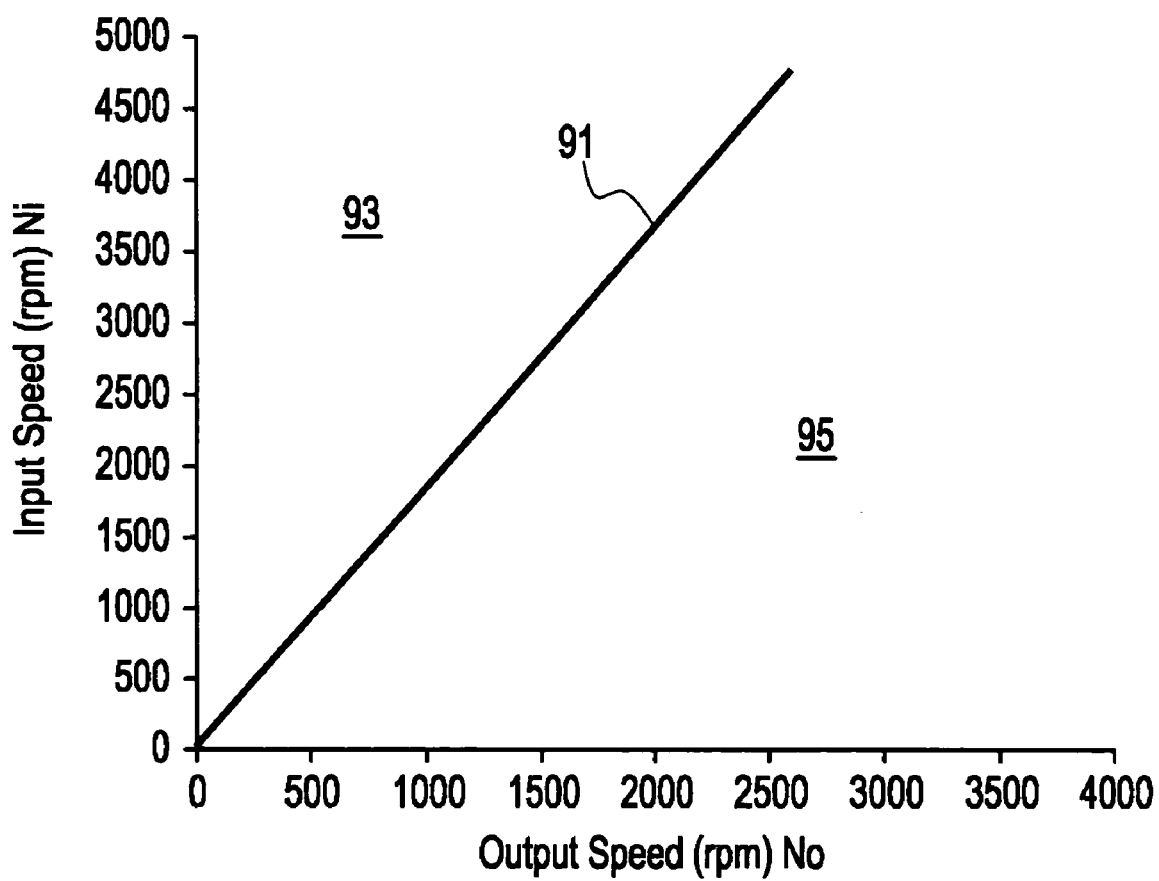
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

The present invention comprises a method 100 for implementing a silent mode 110 or HUSH mode 110 of operating an HEV 115, such as one having powertrain 11, so as to reduce noise and exhaust emissions compared to normal HEV operating modes. While the present invention is particularly suited for use in an HEV 115 having EVT powertrain 11, it is also believed to be applicable to many other series, parallel and EVT HEV powertrain configurations, including single, double or multimode, input, output or compound split EVT configurations. The method preferably is implemented as a complementary series of software control functions or instructions in a silent mode controller 125 such as VCM15, TCM 17, or one of the other controllers described above, that allow the vehicle to operate with reduced noise and emissions where specifically needed, while phasing-in engine power as necessary and subject to certain constraints. Applicants have implemented elements of method 100 in both VCM 15 and TCM 17, but it is believed that method 100 may also be implemented in other control modules or controllers within the vehicle in accordance with system design and other considerations.

Silent mode 110 is particularly applicable for use in an REV comprising a transit bus having an EVT powertrain operating in a tunnel or other enclosed space, such as a parking garage or large building, with a plurality of passenger or other stops. Other applications could include transit buses, garbage trucks or other delivery vehicles operating (with pick-ups and drop-offs) in a noise or exhaust emission restricted region (e.g., hospital zones and certain neighborhoods). Method 100 is applicable over well-defined routes as well as undefined routes within a defined region, and may also be applicable for use where neither a route nor region is predefined, but wherein a location or region is adapted to communicate that silent mode operation is desired to a vehicle that is adapted to receive such communication and implement method 100. As used herein, a "target zone" refers to a location, area or region in which it is desired or intended that the vehicle operates in silent mode 110 so as to effect reduced noise and exhaust emissions.

Figure 4:
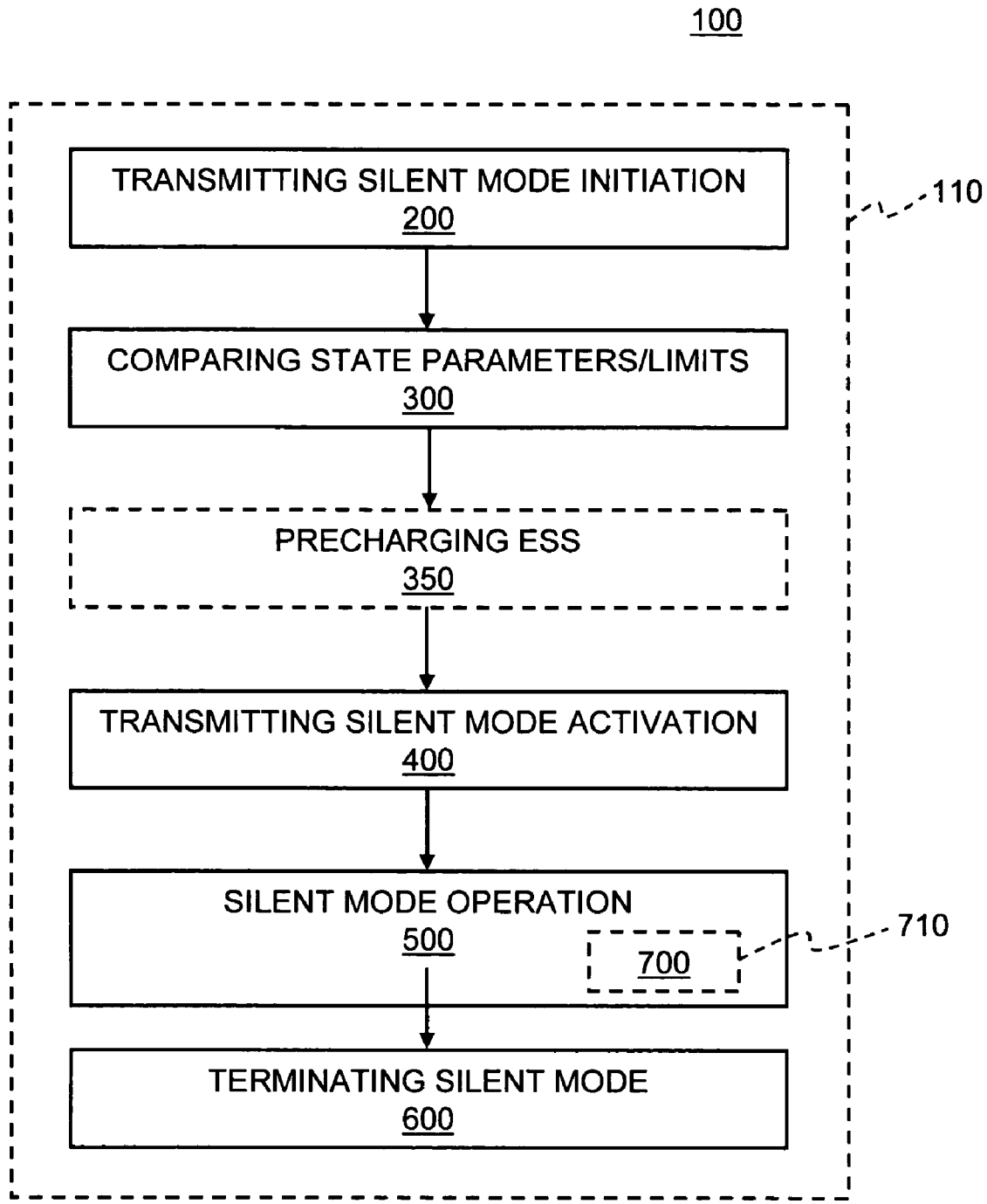
FIG. 4 is a block diagram illustrating steps of the method of the present invention.

Referring to FIG. 4, the present invention may be described generally as a method 100 of providing a silent mode 110 of operation for an HEV 115 having a rechargeable energy storage system 20 (ESS), comprising the steps of: (1) transmitting 200 a silent mode initiation request 120 to a silent mode controller 125; (2) comparing 300 an actual value of at least one state parameter 130 of ESS 20 that is indicative of the availability of ESS 20 for implementing silent mode 110 to at least one silent mode initiation limit value 135 associated with the actual value 130, wherein if the actual value of the at least one state parameter 130 compared to the associated at least one mode initiation limit value 135 indicates that silent mode 110 is allowed, method 100 proceeds to step (3), and wherein if the actual value of the at least one state parameter 130 indicates that silent mode 110 is not allowed, step (2) is repeated so long as silent mode initiation request 120 is being transmitted; (3) transmitting 400 silent mode activation request 140 to silent mode controller 125; and (4) operating 500 the vehicle in silent mode 110 using silent mode controller 125, comprising designating electric drive motor 143 as a primary source of propulsion energy for the vehicle and designating engine 145 as a secondary source of the propulsion energy for the vehicle, wherein a modal quantity 150 of energy in ESS 20 is allocated for use by electric drive motor 143 during silent mode 110 and engine 145 is used to make up the difference between the modal quantity of energy 150 and a total vehicle propulsion energy requirement 155 during silent mode 110; and (4) terminating 500 silent mode 110 in response to the occurrence of mode termination event 160. These steps are described further below.

The first step of method 100 comprises transmitting 200 silent mode initiation request 120 to silent mode controller 125. Silent mode initiation request 120 may be transmitted by any suitable means, such as manual transmitting 200 of silent mode initiation request 120 by a vehicle operator, automatic transmitting 200 of silent mode initiation request 120 as a function of an absolute position of the vehicle, and automatic transmitting 200 of silent mode initiation request 120 as a function of a relative position of the vehicle to a region in which silent mode operation of the vehicle is desired. Manual transmitting 200 of silent mode initiation request 120 by a vehicle operator may be done by actuation of a switch, or making an appropriate selection from a user interface or graphic user interface, such as user interface (UI) 13 (see FIG. 1), that is in signal communication with silent mode controller 125. The transmitting 200 of silent mode initiation request 120 may also be coupled to a suitable feedback indicator and associated implementation mechanism in order to provided an indication to the operator that the request has been made or is being processed by silent mode controller 125, such as incorporating an indicator light into or associated with the manual mode selector means, such as a lighted switch, or a display on UI 13 which indicates that mode initiation request 120 has been made or is being processed. Automatic transmitting 200 of the silent mode initiation request 120 as a function of an absolute position of the vehicle may be accomplished, for example, by automatically and continuously comparing an input signal that is indicative of the actual latitude and longitude position of the vehicle, such as a signal received from a global positioning satellite (GPS), with a set of latitude and longitude coordinates that identify a target zone or target zones, wherein a request for silent mode 110 operation is automatically transmitted 200 as an input signal to silent mode controller 125 if the comparison indicates that the vehicle is in a target zone. Such GPS signals may be monitored by GPS systems that are adapted to automatically and continuously receive such signals and provide an output signal indicative of an absolute latitude/longitude position of the vehicle which are known in the art, and such output signals may be automatically and continuously provided to silent mode controller 125. Automatic transmitting of the silent mode initiation request as a function of a relative position of the vehicle to a region in which silent mode operation of the vehicle is desired may be accomplished, for example, by incorporation of proximity sensors on the vehicle that are adapted to sense a signal associated with and proximate to a target zone. This could include, for example, use of an FM receiver on the vehicle that is adapted to receive an FM signal from a transmitter associated with a target zone, wherein the FM signal is indicative of the proximity of the vehicle to the target zone.

Referring again to FIG. 4, method 100 continues with the step of comparing 300 an actual value of at least one state parameter 130 of ESS 20 that is indicative of the availability of ESS 20 for implementing silent mode 110 to at least one silent mode initiation limit value 135 associated with the actual value 130, wherein if the actual value of the at least one state parameter 130 compared to the associated at least one mode initiation limit value 135 indicates that silent mode 110 is allowed, method 100 proceeds to the next step, and wherein if the actual value of the at least one state parameter 130 indicates that silent mode 110 is not allowed, this test is repeated so long as silent mode initiation request 120 is being transmitted to silent mode controller 125. As described above, state parameters of the ESS, such as battery or BPM 21, may comprise any parameters that are indicative of the availability of the ESS for use generally, and particularly for use in conjunction with implementation of silent mode 110, including parameters that provide information about either the short-term or long-term characteristics or condition of the ESS. These include the instantaneous battery temperature ($T_{BAT}$), the battery SOC and the average amp-hour per hour throughput of the battery (AH/H). The $T_{BAT}$ is an important parameter because both charging and discharging of the battery increase the battery temperature (e.g. Under most conditions charging has the greater effect on temperature, but discharging also increases the battery temperature). As the battery temperature increases, the charging and discharging efficiency and the ability to obtain and maintain a desired SOC is affected. Further, overheating of the battery can also reduce its service life and available total amp-hour/hour throughput. The battery SOC is an important parameter because it provides an important indication of the total energy available in the battery, and its ability to provide charge to or accept charge from DPIM 19 and the other components of EVT 11. SOC is also important because high and low SOC conditions are associated with overvoltage and undervoltage conditions, respectively, both of which can damage the battery and reduce its service life. The integrated amp-hour/hour throughput is an important parameter because it is known to be directly related to the operational service life of the battery. The amp-hour per hour throughput of the ESS may be measured by integrating the ESS current over time using a predetermined filter and algorithm. Further details regarding amp-hour per hour throughput can be found in commonly assigned, co-pending U.S. provisional patent application Ser. No. 60/511,456, which is hereby incorporated herein by reference in its entirety. In a preferred embodiment, this step comprises comparing 300 $T_{BAT}$ to a silent mode initiation battery temperature limit value 135, wherein if $T_{BAT}$ is less than the mode initiation battery temperature limit value ($T_{SMI}$), the method proceeds to step (3), and wherein if $T_{BAT} \geq T_{SMI}$, this step is repeated so long as silent mode initiation request 120 is being transmitted.

Where ESS comprises a battery, if $T_{BAT} \leq T_{SMI}$, method 100 preferably also comprises a step (2A) of precharging 350 the battery 21 prior to initiation of silent mode 110. This is preferred in order to ensure that battery 21 has an SOC that is sufficient to supply the quantity of electrical energy necessary to implement method 100, as described herein. It is also preferred when precharging 350 that this step be limited to precharging the ESS to a state of charge (SOC) value that is less than or equal to a target precharge SOC limit 165. The purpose of this SOC precharging limit is to limit the temperature increase in the battery associated with charging. Another purpose of the upper precharging SOC limit is to make for consistent charge times and to ensure that enough energy is in the ESS while not unnecessarily increasing the AH/H throughput or SOC swing of the ESS by driving the SOC higher than necessary to travel the target distance. There are also life considerations with how much and how quickly the SOC swings from minimum to maximum. One purpose behind the maximum SOC precharge limit is to keep the SOC high enough that if the silent mode uses the entire allocated budget, the minimum limit would not be exceeded. Because precharging 350 is done in anticipation of an immediate and possibly extended discharge from battery as silent mode 110 is initiated, and because discharge also causes additional heating of the battery, it is preferred that precharging be limited to an SOC that is less than or equal to target precharge SOC limit 165. The target precharge SOC limit 165 will necessarily vary depending on the capacity, construction and configuration of battery 21 and other system design factors such the maximum battery power requirements associated with projected vehicle loads, target zone parameters and other factors, and may be expressed as a target value, minimum/maximum value or other similar method of identifying a limit value. For example, in one embodiment associated with BPM 21, where the length of the target zone was about 2.2 km. and the battery had a total capacity ($SOC_{100\%}$) of about 19 amp-hours, the target precharge SOC limit 165 was about 60%, or 11.4 amp-hours. When the SOC of battery 21 reaches target precharge SOC limit 165, precharging 350 is complete and silent mode controller 125 stops precharging 350. Precharging 350 is also preferably terminated if silent mode 110 is initiated prior to the battery SOC reaching target precharge SOC limit 165. It is preferred that precharging 350 comprises charging ESS 20 at a maximum charging power of the vehicle consistent with control of parametric ESS limits associated with ESS charge/discharge, SOC and temperature, such as those described in commonly assigned, co-pending U.S. patent application Ser. No. 60/511,456. Further, during precharging 350 the vehicle is adapted to operate engine 145 at a combination of Ni and Ti that maximizes the charging power available to the ESS and which are generally consistent with other system requirements, such as the desired No and To. However, the step of precharging 350 may be adapted to select combinations of Ni and Ti that preferentially maximize the charge power to the ESS, even though such choices may constrain the possible values of No and To to values that are less than desired or commanded values. The method of determining combinations of Ni and Ti to affect the desired control of the EVT powertrain are described in commonly assigned, co-pending U.S. patent application Ser. Nos. 10/686,508 and 10/686,034, which are hereby incorporated herein by reference in their entirety. When the desired target precharge SOC is reached during precharging 350, charging is preferably stopped and is not resumed unless vehicle operation requires a discharge that causes the SOC to drop below the target precharge SOC. Precharging 350 may also be scheduled for a particular duration of time, subject to parametric limits as described herein. The step of precharging 350 is preferred, but optional and not essential to the practice of method 100, since ESS 20 may comprise more than battery 21, as explained above, and because even when ESS consists of a battery, the control algorithms concerning SOC may be such that precharging 350 is not required prior to implementing method, such as HEVs in which other constraints require that the SOC always be maintained at a level that is sufficient to implement silent mode 110 without the need for precharging.

Referring to FIG. 4, following the steps of comparing 300 and any precharging 350, method 100 proceeds with the step (3) of transmitting 400 silent mode activation request 140 using silent mode controller 125. Transmitting 400 may be accomplished in a manner analogous to the step of transmitting 200, in that silent mode 110 may be activated by transmitting 400 silent mode activation request 140 to silent mode controller 125 by any suitable means, such as manually transmitting 400 silent mode activation request 140 by a vehicle operator, automatically transmitting 400 silent mode activation request 140 as a function of an absolute position of the vehicle, and automatically transmitting 400 silent mode activation request 140 as a function of a position of the vehicle relative to a region in which silent mode operation of the vehicle is desired. Transmitting 400 of silent mode activation request 140 may also be accomplished as a function of elapsed time or distance after transmitting 200 of silent mode initiation request 120, or initiation or completion of precharging 350.

Figure 6:
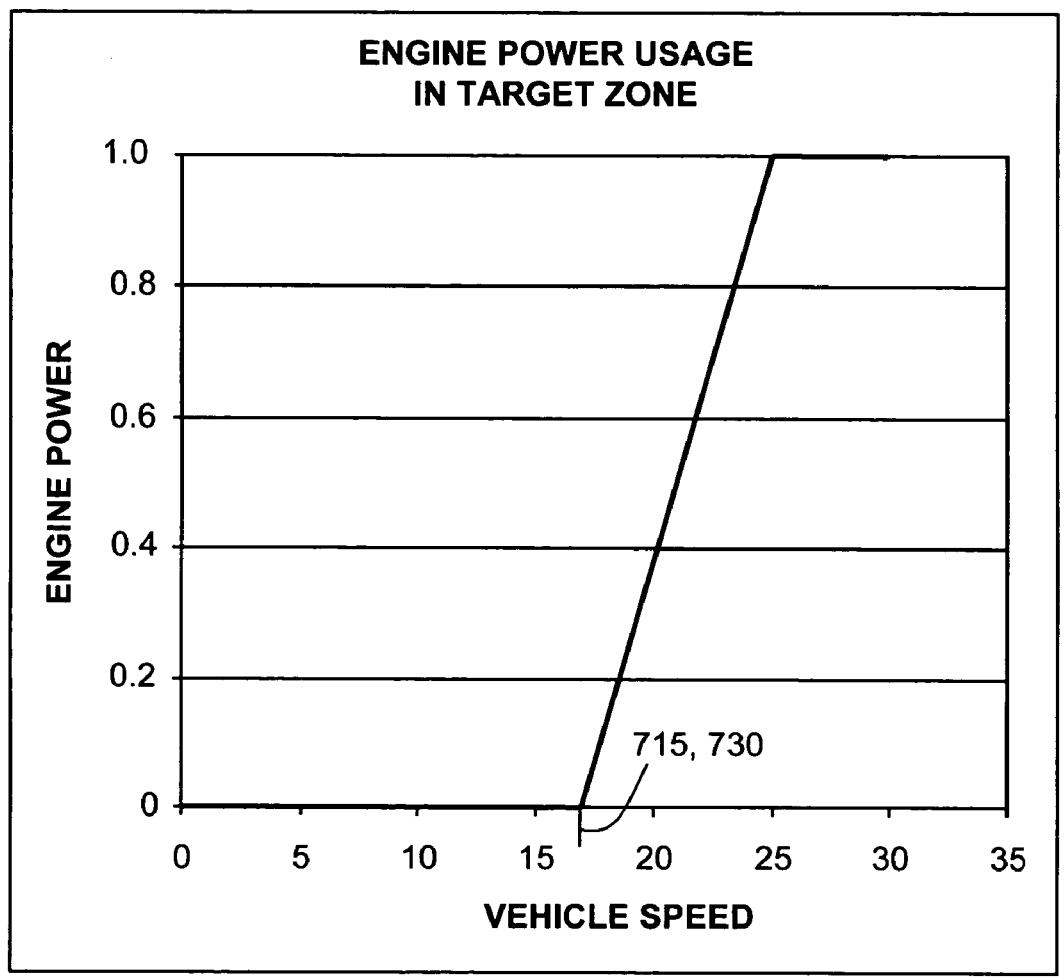
FIG. 6 is a plot of engine output power is a function of vehicle speed illustrating engine power usage in a target zone for the method of the present invention.

Referring to FIG. 4, following the steps of transmitting 400 of silent mode activation request 140, method 100 proceeds with step (4) of operating 500 the vehicle in silent mode 110 using silent mode controller 125, comprising designating an electric drive motor 143, such as motor A (56) or motor B (72), as a primary source of propulsion energy for the vehicle and designating an engine 145, such as engine 14, as a secondary source of the propulsion energy for the vehicle, wherein a modal quantity 150 of energy in ESS 20 is allocated for use by electric drive motor 143 during silent mode 110 and engine 145 is used to make up the difference between modal quantity of energy 150 and the total vehicle propulsion energy 155 requirement during silent mode 110. Engine 145 is secondary in that it is only used in order to make up the difference between modal quantity of energy 150 and the total vehicle propulsion energy 155 requirement during silent mode 110, and if modal quantity 150 is sufficient, engine 145 is preferably not fueled and rotated by electric drive motor 143, such as motor A (56) or motor B (72). If engine 145 is required, it is only fueled so as to provide the necessary propulsion energy differential, rather than, for example, at its maximum rated capacity. This is illustrated in FIG. 6, which plots engine 145 output power as a function of vehicle speed for a particular point of consumption of the SOC allocated for silent mode 110 for illustration of an exemplary implementation of method 100. At a vehicle speeds below about 17 mph, there is no output power or energy contribution from engine 145. At vehicle speeds from 17 mph to about 24 mph, the propulsion energy contribution of engine 145 is increased at a constant rate to a maximum silent mode value at vehicle speeds above about 24 mph. The maximum engine output power while the vehicle is in silent mode 110 is limited to a maximum silent mode output power limit 175 that is preferably selected to be less than a maximum output power 180 of engine 145 in order to reduce noise and exhaust emissions in the target zone. A modal quantity 150 of energy in the ESS 20 is allocated for use during silent mode 110. Modal quantity 150 may comprise any portion of the available SOC of the battery. However, in order to simplify implementation of method 100, it is preferred that the portion of the SOC allocated as modal quantity 150 comprise a fixed portion or percentage of the maximum SOC, or maximum energy storage capacity of battery 21. For example, in the case of a battery 21 having a maximum energy storage capacity of 19 amp-hours, modal quantity 150 of battery energy comprised 4.75 amp-hours, or about 25% of the maximum SOC. However, if precharging 350 does not provide the desired target precharge SOC value, or if the actual SOC level at exceeds the target precharge SOC, method 100 may adapt modal quantity 150 of energy to adjust for the deficit or surplus, as further described herein.

Figure 5:
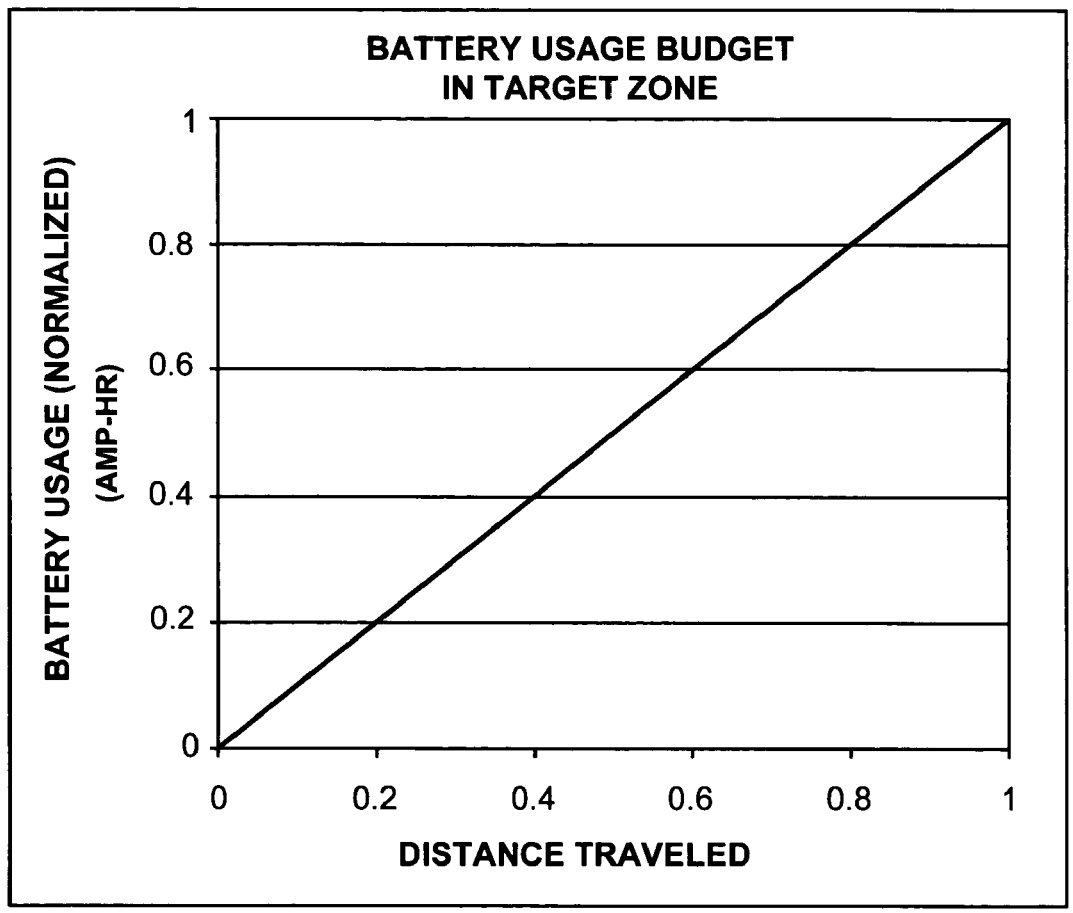
FIG. 5 is a plot of battery usage as a function of distance traveled in the target zone to illustrate a battery usage budget for the silent mode of the method the of present invention.

Modal quantity 150 of energy may be allocated for use during silent mode 110 according to any suitable allocation scheme, but a preferred scheme is to establish or calculate an ESS usage budget 185 for use during silent mode 110, such as the one shown in FIG. 5, wherein modal quantity 150 of battery energy is normalized and allocated as a function of the total distance traveled, or length of the target zone. The budget may be linear or non-linear depending on variations associated with target zone along its length (e.g., extended stops, grade variations, etc.) vehicle load and other factors.

As the vehicle travels through the target zone, the actual usage of modal quantity 150 of battery energy deviates from the ESS usage budget. When deviations occur such that actual usage of modal quantity 150 of ESS propulsion energy is greater than the budgeted amount, engine 145 is used to supply the difference. The amount of engine output power necessary may be calculated as a function of vehicle speed and a speed/charge consumption dependent ESS budget factor (EBF) 190. EBF 190 provides an indication of how much the amount of ESS energy actually consumed as a function of distance in the target zone has deviated from the ESS usage budget established for modal quantity of energy 150 associated with that distance. The EBF 190 is calculated as:

$$EBF = 1 - \frac{(\Delta SOC_{INSTANT} - \Delta SOC_{BUDGET})}{K}$$

where:

$\Delta SOC_{INSTANT} = SOC_{INITIAL} - SOC_{INSTANT}$ $\Delta SOC_{BUDGET} = SOC_{BUDGET} - SOC_{INSTANT}$ and $SOC_{BUDGET}$=the amount of $SOC_{100\%}$ budgeted for use during the silent mode as a function of distance, in percent;

$SOC_{INITIAL}$=the SOC at the initiation of the silent mode, in percent;

$SOC_{INSTANT}$=the instantaneous SOC as a function of distance, in percent;

$SOC_{100\%}$=the total charge capacity of the battery; and

K=a constant for a given EVT powertrain, similar to a gain, and in an EVT 11 HEV, the value of K was preferably about 5.

Figure 7:
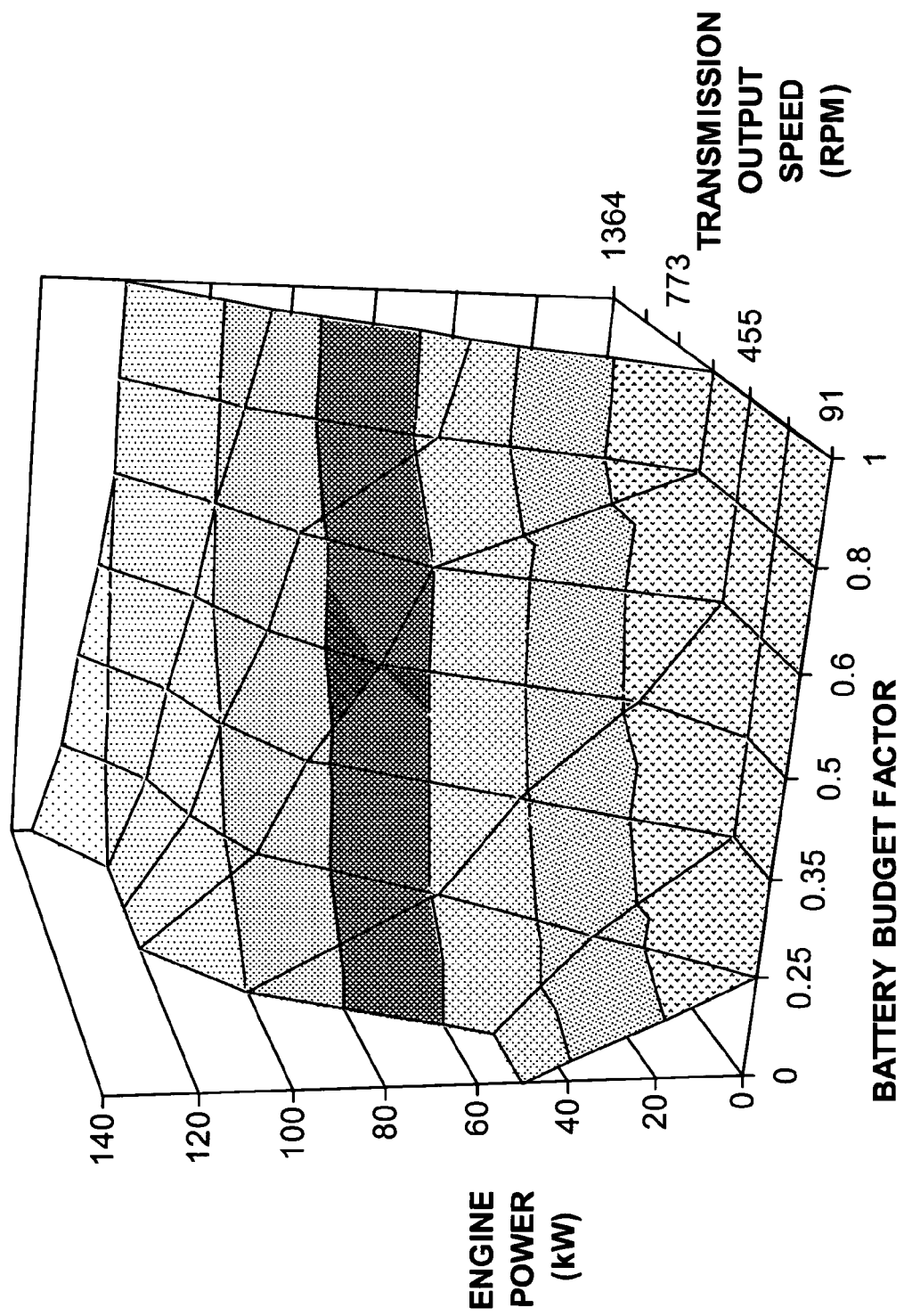
FIG. 7 is a plot of engine output power as a function of transmission output speed and a battery budget factor for the method of the present invention.
Figure 8:
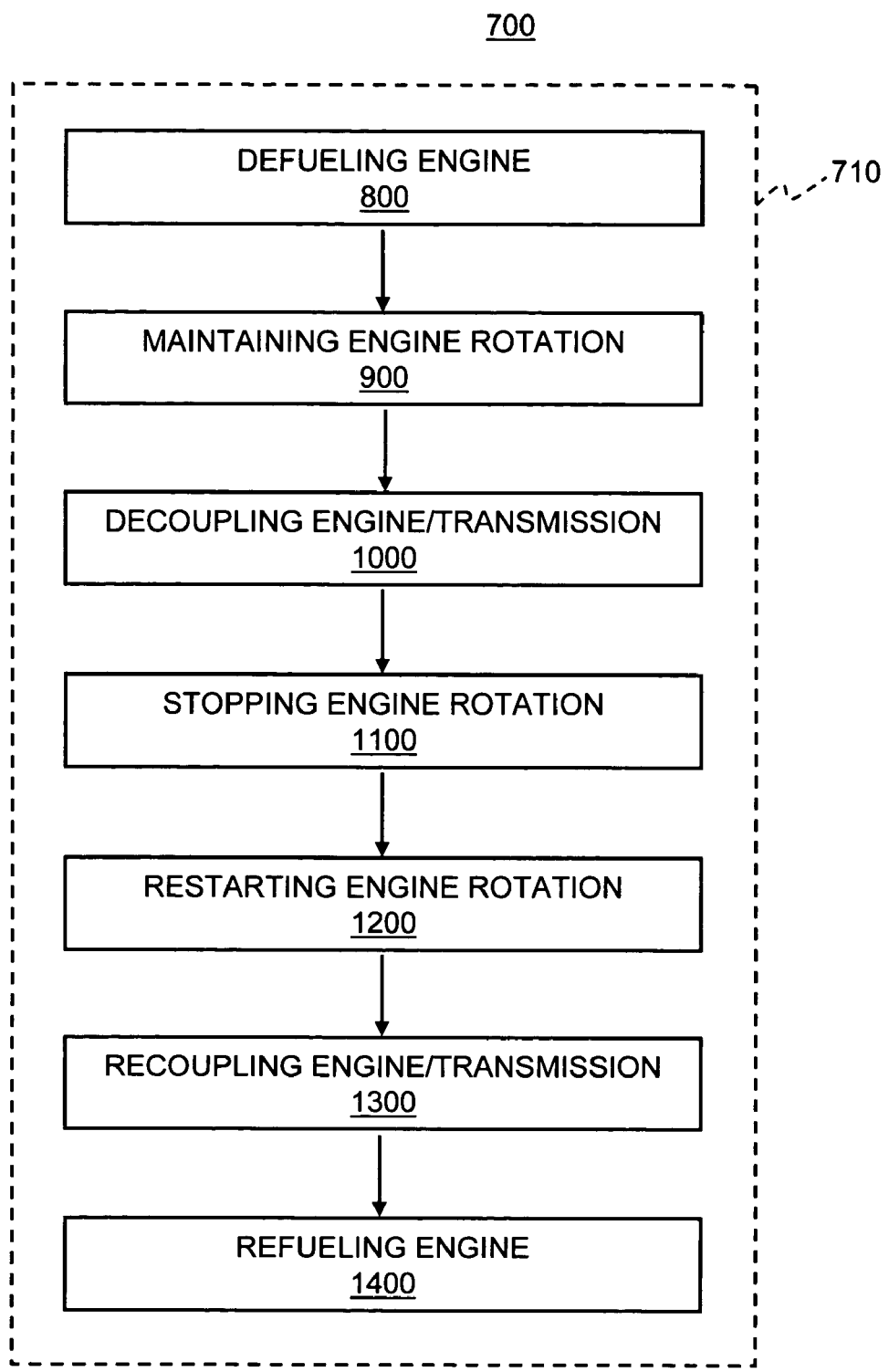
FIG. 8 is a block diagram illustrating steps of the method of the stop mode of the present invention.

FIG. 7 illustrates a plot of engine output power as a function of EBF 190 and the transmission output speed in revolutions per minute, which is directly related to the vehicle speed. In the illustrated embodiment, the transmission output speed (rpm) was related to vehicle speed (mph) by multiplying transmission output speed by a factor of 0.022. This relationship may be stored in a lookup table. The axes represent boundary conditions. At transmission output speeds above 1364 rpm, motor output power is constant as a function of vehicle speed and varies only modestly as a function of the battery budget factor 190. The battery budget factor is limited to 0 for values that are less than zero and 1 for values that are greater than 1. For negative vehicle speeds, the output power was limited to the values associated with zero vehicle speed The value of EBF 190 may be calculated by silent mode controller 125 and vehicle output speed may be obtained from, for example, TCM 17. These may be used to look up the engine output power necessary to make up any differences between the budgeted amount of modal quantity 150 of energy allocated for propulsion of the vehicle and the total vehicle propulsion energy requirement. The engine output power from the look up table is used by VCM 15 to affect control of engine 145 and supply the difference between the ESS budget amount and the total vehicle propulsion requirement based on the EBF.

As noted above, if the actual precharge SOC deviates from the target precharge SOC, either higher or lower, the ESS budget is preferably adjusted using a ESS budget adjustment factor (EBAF), which may be developed empirically or theoretically based upon the target precharge SOC and its desired design limits. In an exemplary embodiment, where the target precharge SOC was 60% and the modal quantity 150 was 25% of the maximum SOC, the EBAF was calculated as shown below:

$$EBAF = \frac{SOC_{INITIAL} - 30}{25}$$

where EBAF was constrained to values in the range. $0.1 \leq EBAF \leq 1$. The battery budget was multiplied by the EBAF to adjust the battery budget for deviations of $SOC_{INITIAL}$ from the target precharge SOC.

Referring to FIG. 4, following the step of operating 500 the vehicle in silent mode 110, method 100 proceeds with step (4) comprising terminating 600 silent mode 110 in response to the occurrence of mode termination event 160. There are a plurality of mode termination events that may be selected from the group consisting of: (a) manual transmitting of a silent mode termination request by a vehicle operator, (b) automatic transmitting of a silent mode termination request as a function of the absolute position of the vehicle, (c) automatic transmitting of a silent mode termination request as a function of a relative position of the vehicle to a region in which silent mode operation of the vehicle is desired a manual mode termination command, (d) reaching a predetermined silent mode elapsed time limit, (e) reaching a predetermined silent mode elapsed distance limit, and (f) reaching at least one ESS state parameter termination limit. Mode termination events (a)–(c) are analogous to the corresponding events described above associated with transmitting mode initiation and mode activation requests, except that they are associated with exiting, rather than entering, a target zone, and may be performed in the manner described therein. Mode termination events (d) and (e) are particularly adapted for use when either an elapsed distance within the target zone or an elapsed time within target zone is known or can be characterized sufficiently such that an elapsed mode distance limit or an elapsed mode time limit, respectively, can be established for automatic termination of silent mode 110. The actual elapsed mode distance can be determined for comparison against the elapsed mode distance limit by measuring an odometer signal when silent mode 110 is initiated and periodically comparing it with an instantaneous odometer value in order to develop an actual elapsed mode distance value. Similarly, the actual elapsed mode time can be determined for comparison against the elapsed mode time limit by initiating a timer when silent mode 110 is initiated and periodically comparing the initial value with an instantaneous timer value in order to develop an actual elapsed mode time value. Mode termination events (f) comprises reaching at least one ESS state parameter termination limit. As described above, in the case where ESS comprises a battery, the state parameter may comprise a maximum battery temperature limit, wherein reaching the maximum limit temperature triggers the termination of silent mode. The limit temperature should be selected so as to protect the battery from conditions that could cause short term or long term damage. For example, in an embodiment where the ESS comprised a NiMH battery, a limit of 50° C. was selected. Similarly, in the case where ESS comprises a battery, the state parameter may comprise a minimum battery SOC limit, maximum battery SOC limit, or both, wherein reaching the limit SOC triggers the termination of silent mode. For example, in an embodiment comprising a NiMH battery, minimum/maximum SOC limits of $20\% \geq SOC \geq 90$ were selected.

Referring to FIGS. 6 and 7, the maximum silent mode output power limit of engine 145 is automatically controlled as a function of vehicle speed. As vehicle speeds approach zero, the maximum silent mode output power of engine 175 is gradually reduced, until at relatively low vehicle speeds that are less than a vehicle stop threshold value 710, but greater than zero, the maximum silent mode engine output power 175 becomes zero, except for very low values of the battery budget factor (i.e., situations where the consumption of the battery charge is significantly ahead of the budgeted amount). The maximum silent mode engine output power 175 may be reduced by gradually defueling (gradually reducing the amount of fuel supplied per unit of time) engine 145. As the amount of fuel is reduced, engine 145, the maximum silent mode engine output power 175 is also reduced, until at the vehicle stop threshold value 710, the fueling is stopped altogether and the maximum silent mode engine output power 175 becomes zero. For example, referring to FIG. 6, when EBF=1 (i.e., actual power consumption equals the budgeted amount), vehicle stop threshold value 710 is about 17 mph. Even though fueling is stopped at vehicle stop threshold value 710, engine 145 is preferably rotated by one of the at least one electric drive motors 143. Rotation of the engine and members which are coupled to it improves the responsiveness of the overall EVT powertrain to engine restart requests and also permits common mechanical and/or hydraulic subsystems, such as transmission lubrication systems, to be powered even while the output power of the engine is zero without the need for expensive reengineering to provide their functionality while the engine is not rotating.

It is preferred that silent mode I 10 also be adapted to detect and respond to changes in the grade of the route over which vehicle is operated while it is in silent mode 110, because an increased grade may cause significant deviations from the battery budget and effect performance in the mode because it results in slow vehicle speeds which may not otherwise call for any, or for increased engine output power. For a given vehicle, parametric limit values of output torque (To), output speed (No) and vehicle acceleration (No_dot) can be developed that are indicative of the grade of the route and its slope, which may be described generally as ranges of high output torque, slow or slowing vehicle speed and low or slowing acceleration. Parametric limits in these values may be established, and incorporated into the silent mode controller such as by the use of a look up table or tables. Applicants have determined that upon detection of a grade that exceeds parametric limits, electric-only propulsion power may not enough to accelerate the vehicle up a grade, and that it is desirable to command an engine output power (e.g., 100 kW) under such conditions that will insure that the total vehicle propulsion energy is sufficient, and which will also ensure that vehicle is operating in a range of output power wherein the silent mode control algorithm is effective to maintain proper control in view of the silent mode battery budget, and wherein the battery budget factor provides an accurate indication of the required output power as a function of vehicle speed.

Method 100 also preferably comprises an automatic engine stop/restart and range select method 700, referred to herein as engine stop mode 710, which may be incorporated into and used in conjunction with silent mode 110. Method 700 allows the engine to shut down automatically when the vehicle is stopped loading and unloading passengers. This feature reduces the noise and emissions of the vehicle when stopped, which not only benefits the passengers on the bus, but also benefits the operators and by-standers near the bus. Engine stop mode 710 is particularly advantageous in that it makes the most significant reductions in noise and exhaust emissions at the points that they are most noticeable to operators, passengers and bystanders, namely the points at which the vehicle stops, such as pick-up and drop-off points.

To enhance the benefit of reductions in noise and exhaust emissions at pickup and drop-off points, it is also desirable to affect substantially reduced noise and exhaust emission control in regions immediately adjacent to such stopping points, which are referred to herein as stop zones. Stop zones are simply regions adjacent to pick-up and drop-off points. Stop zones may be characterized or bounded in a number of ways including a physical geographic boundary surrounding a pickup or drop-off point or, for example, as a function of vehicle speeds adjacent to the pick-up and drop-off, as the vehicle slows to stop at the stopping point and accelerates away from it.

Referring to FIGS. 1 and 4, engine stop mode 710 is characterized most generally by bringing engine 145 to a complete stop in response to an engine stop event, typically a door open indication, and restarting engine 145(with zero fuel) in response to an engine start event, typically a door closed indication. Engine stop mode 710 may also preferably includes defueling engine 145 as a vehicle enters a stop zone, and refueling engine 145 upon departure from a stop zone. Stop mode 700 also preferably incorporates special control of the EVT powertrain in conjunction with bringing engine 145 to a complete stop in order to reduce transient noise and vibrations associated with bringing engine 145 to a complete stop.

Method 700 comprises an engine stop mode 710 of operation for a hybrid electric vehicle having an engine 145 that is operatively and selectively coupled to electric drive motor 143 and transmission 64, comprising the steps of: (1) defueling 800 engine 145 and maintaining 900 rotation of engine 145 by rotation of electric drive motor 143 at a vehicle speed that is less than a vehicle stop threshold value 715; and (2) decoupling 1000 engine 145 and transmission 64 in response to a first predetermined vehicle operating condition 720 and stopping 1100 the rotation of engine 145. Method 700 and stop mode 710 may be implemented as a computer control algorithm in a stop mode controller 725. Stop mode controller 725 is preferably incorporated into one of the vehicle controller or control modules, such as TCM 17. Engine 145 is operatively and selectively coupled to electric drive motor 143 and output shaft or transmission 64 according to the arrangement described above and in FIG. 1. By operatively and selectively, it is simply meant that both electric drive 143 and transmission 64 may be coupled and decoupled with respect to providing torque to or receiving torque from engine 145. Engine 145 defueling 800 while maintaining 900 its rotation is described above as a function of vehicle speed and EBF in conjunction with silent mode 110. As shown in FIG. 6, at a vehicle speed that is less than a vehicle stop threshold value 715, engine 145 is defueled and engine output power is zero. For example, engine 145 may be maintained at an idle speed of approximately 800 rpm while defueled using electric drive motor 143. The vehicle stop threshold value 715 is also preferably a function of the battery SOC, so that the stop zone is smaller if the EBF is smaller (i.e., a larger deviation from the battery budget). The step of decoupling 1000 engine 145 and transmission 64 in response to a first predetermined vehicle operating condition 720 preferably comprises commanding a neutral state of the transmission in response to a condition that is indicative of a vehicle stop. This may be any state or condition associated with the vehicle to which an engine stop may be associated, or that is generally indicative that an engine stop is desired, but preferably comprises the opening of the door or doors of the vehicle. The opening of the door may be sensed and provided to stop mode controller using conventional switches or other conventional means. If the neutral state is not attained or the not attained before the command times out the step of stopping 1100 the rotation of engine 145 may be accomplished by simply permitting the frictional forces and mechanical losses to slow engine 145 to a stop. However, if the neutral state of the transmission has been attained, it is preferred to automatically apply a torque to oppose the rotation of engine 145 using electric drive motor 143 in order to reduce the time required to stop the rotation of engine 145 and thereby provide a more rapid transition through the natural harmonic frequencies of engine 145, at which its vibration energy and resultant noise emissions are significantly increased (e.g., in an exemplary embodiment, about 350 rpm).

Method 700 also preferably comprises the further steps of: (3) restarting 1200 rotation of the engine in response to a second predetermined vehicle operating condition 730 using electric drive motor 143; and (4) recoupling 1300 the engine 145 and transmission 64. Second predetermined vehicle operating condition 730 may be any state or condition associated with the vehicle to which an engine restart may be associated, or that is generally indicative that an engine restart is desired, but preferably comprises closing the door or doors of the vehicle. The closing of the door may also be sensed and provided to stop mode controller 725 using conventional switches or other conventional means. Restarting 1200 rotation of the engine 145 comprises applying a torque to engine 145 in the direction of the desired rotation using electric drive motor 143. Recoupling 1300 the engine 145 and transmission 64 comprises selecting the operative coupling of the engine 143 and transmission 64 and preferably comprises commanding 1400 a range state of engine 145 and transmission 64.

Referring to FIGS. 6 and 7, method 700 also preferably comprises the step of (5) refueling 1500 the engine at a vehicle speed that is greater than a vehicle restart threshold value 730. Referring to FIGS. 6 and 7, refueling 1400 engine 145 is also a function of vehicle speed and EBF in conjunction with silent mode 110. This step also generally comprises commanding 1600 a vehicle speed to electric drive motor 143. If the vehicle speed is greater than or equal to vehicle restart threshold value 730, engine 145 is refueled. If the vehicle speed is less than vehicle restart threshold value 730, engine 145 is not fueled and operation in the stop mode continues in anticipation of repeating method 700 at a subsequent stop. The vehicle restart threshold value 730 is also preferably a function of the battery SOC, so that the stop zone is smaller if the EBF is smaller (i.e., a larger deviation from the battery budget). The restart threshold value 725 may be different than the stop threshold value, but is preferably the same value. It is also preferred that the battery charge budget does not override the engine stop mode at vehicle stops.

Figure 9:
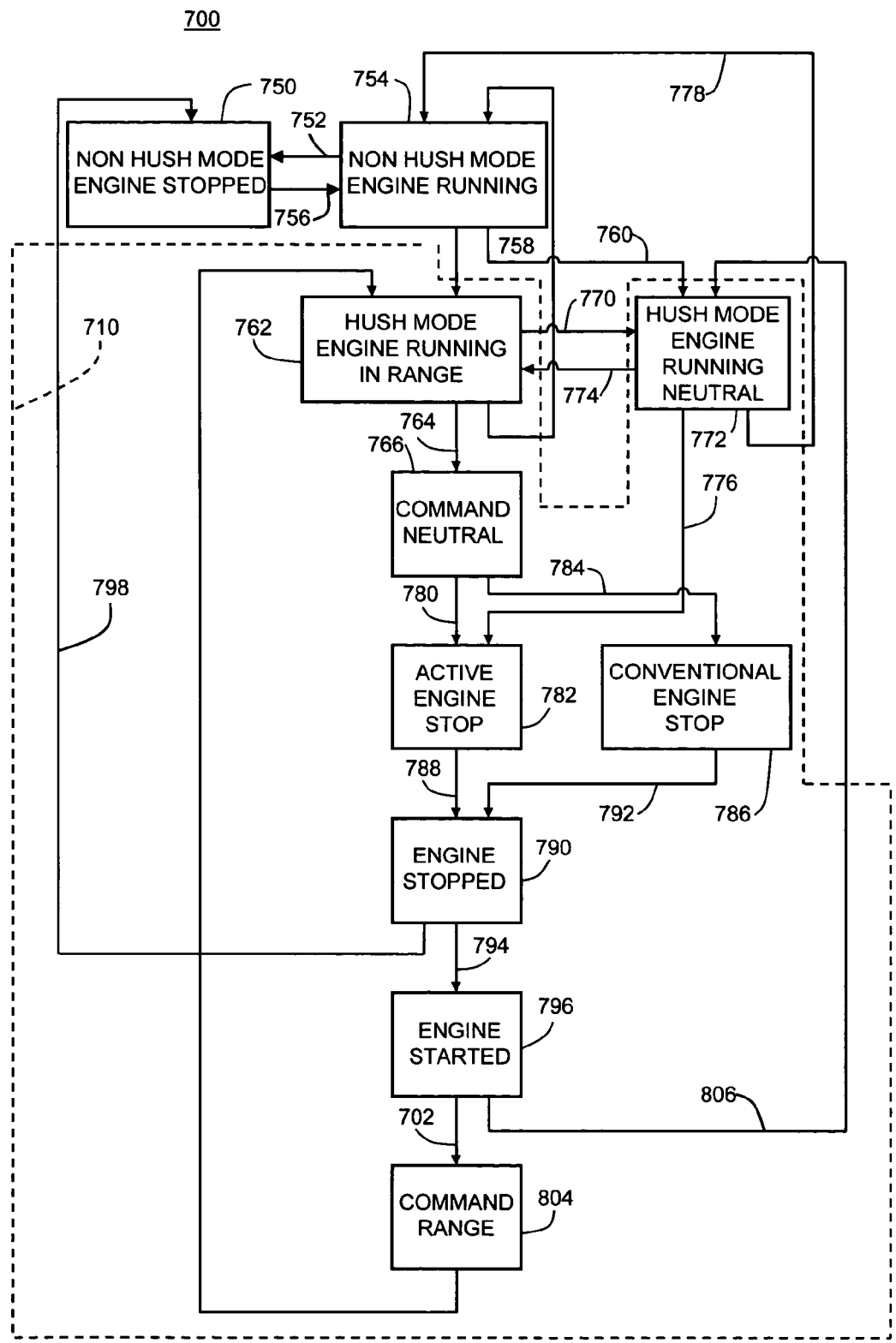
FIG. 9 is a block diagram illustrating various states and transitions of the EVT powertrain associated with the stop mode of the method of the present invention.

FIG. 9 illustrates preferred embodiment of the general states and transitions of a vehicle having an EVT powertrain, such as EVT powertrain 11, comprising electric motor drive 143, engine 145 and transmission 64 while transitioning into and operating within stop/restart mode 710. Referring to FIG. 9, block 750 represents a state wherein the vehicle is not in hush mode and the engine is stopped. A transition 752 is illustrated comprising the operator starting engine 145 through normal start button actuation. Following transition 752, block 754 represents a vehicle state wherein the vehicle is not in silent mode 710 (normal operating mode) with engine 145 running, whereupon transition 756, where driver shuts engine off through key switch, transition 758, where driver selects HUSH mode and the transmission is in range, and transition 760, where driver selects silent mode and transmission is in neutral, are possible. Transition 756 simply returns to block 750. Transition 758 results in a state represented by block 762, where the vehicle is in silent mode, engine 145 is running and transmission 64 is in range. From block 762, transition 764 is possible, wherein the vehicle is in silent mode and vehicle speed is less than the vehicle stop threshold value, such that engine 145 is defueled with engine 145 rotated by electric dive motor 143, vehicle is generally stopped and a first predetermined operating condition is detected, such as a door open. Following transition 764, the vehicle state represented by block 766 comprises commanding a neutral state of transmission 64. Referring back to block 762, transition 768 is also possible, wherein the operator deselects silent mode 110 and returns to block 754, whereupon the selections available from the state represented by block 754 are possible. Referring again to block 762, transition 770 is also possible, wherein, the operator selects a neutral state of the transmission. Following transition 770, the vehicle state represented by block 772 comprises silent mode operation with the vehicle stopped, engine running and the transmission in a neutral state. From the state represented by block 772, transition 774, where the operator may selects the range or operatively coupled state for transmission 64 and thereby returns to block 766 and the transition choices therefrom, transition 776, wherein the vehicle is in silent mode and vehicle speed is less than the vehicle stop threshold value, such that engine 145 is defueled with engine 145 rotated by electric dive motor 143, vehicle is generally stopped and a first predetermined operating condition is detected, such as a door open, and transition 778, wherein the operator de-selects the silent mode and returns to block 754 with its possible transitions. Referring again to block 766, transition 780, comprising attaining a neutral state of transmission, and resulting in a state represented by block 782, comprising an active shut down of engine 145, wherein electric drive motor 143 is used to apply a torque opposite the direction of rotation of engine 145 (wherein the operator still has range selected even though neutral state has been automatically commanded and attained ); and transition 784, comprising not attaining a neutral state of transmission and the command is timed out waiting for attaining neutral, resulting in a state represented by block 786, comprising a conventional engine stop with transmission 64 in range. Referring to block 782, transition 788 is possible, wherein engine 145 is stopped. Referring to block 782, transition 788 is possible, wherein engine 145 is actively stopped (range selected), resulting in a state represented by block 790, wherein engine 145 is stopped. Referring to block 786, transition 792 is possible, wherein engine 145 is passively stopped (range selected), resulting in a state represented by block 790, wherein engine 145 is stopped and silent mode is still selected. Referring to the state represented by block 790, transition 792, comprising occurrence of the second predetermined vehicle operation condition (i.e. door closed) while vehicle is in silent mode 110, resulting in the state represented by block 794, wherein range is commanded to the transmission; and transition 796, comprising occurrence of the second predetermined vehicle operating condition (i.e. door closed) and the termination of silent mode 110 by a mode termination event, resulting in a state represented by block 750, and transition choices available from this block. Referring to block 794, transition 798, comprising the automatic restart of engine 145, service brakes are applied, and range is selected (i.e. vehicle was in range before engine 145 was shutdown), resulting in a state represented by block 802, wherein range is automatically commanded to transmission 64; and transition 804, comprising the automatic restart of engine 145, service brakes are not applied, or range is not selected (i.e. vehicle was in range before engine 145 was shutdown), or both, resulting in a state represented by block 772, and transition choices available from this block. Referring to block 802, transition 806 comprises vehicle attaining range, resulting a state represented by block 762, and transition choices available from this block.

To illustrate method 10, as an example consider the case of an HEV transit bus, having EVT powertrain 11 and a rechargeable NiMH battery pack, operating in a tunnel with passenger stops. Prior to entering the tunnel, an operator transmits a silent mode initiation request by actuating a silent mode switch that comprises an indicator lamp. The silent mode controller evaluates TBAT to determine whether $T_{BAT} \leq T_{SMI}$. If this condition is satisfied, silent mode controller commands the precharging of the battery and also provides a command to intermittently light the indicator lamp to indicate to the operator that precharging is underway. Silent mode controller commands the charging of the battery up to the target precharge SOC limit 165, or until the bus enters the tunnel and the operator transmits a silent mode activation request by actuating a silent mode activation switch which may also provide a lighted feedback indication to the operator. In the tunnel the vehicle is propelled by the electric drive motor according to a predetermined energy budget developed for the target zone or tunnel and the engine is operated at a minimal level so as to generally only provide the additional propulsion energy necessary when, due to stops, vehicle load, grade or other variables, the electric energy consumed by the electric drive motor is greater than the budgeted amount as a function of the distance traveled. This is accomplished by commanding engine power based on the vehicle speed and the ESS budget factor regardless of the output power requirements. If the output power requirements exceed the commanded engine power, the ESS supplies the necessary power to fill in the deficit. If the output power requirements are less that the commanded engine power, the ESS is charged. Minimizing the engine power output reduces the noise and exhaust emissions within the tunnel. As the bus approaches a passenger pick-up point the vehicle speed slows to below the vehicle stop threshold value (and the engine is defueled or commanded to zero fuel) as the bus is slowing for the stop. At the stop, the doors are opened and the stop mode controller sends an engine stop request. Then the engine is stopped, thereby reducing noise and exhaust emissions at the pick-up point, and passengers board. After passengers are picked up, the vehicle removes the shut down request (typically when the doors close), the engine automatically restarts (but is not fueled) and the drive unit automatically goes into range, allowing the vehicle to move. If the vehicle speed is greater than the engine restart threshold, the engine is refueled. If the speed does not exceed the threshold, the engine is not fueled, in anticipation of another stop. If the vehicle maintains a speed that is less than the threshold using the battery for a period sufficient to exceed the battery budget, the engine restart threshold value is eventually lowered until the vehicle speed exceeds the threshold and the engine is refueled in order to provide propulsion energy to operate the vehicle. After a series of similar tubes and pick-ups, either the operator commands exit from the silent mode, or exit is commanded automatically, and the vehicle returns to normal operation.

It will be apparent to those skilled in the art, that although the invention has been described in terms of specific and preferred embodiments and examples, modifications and changes may be made to the disclosed embodiments without departing from the essence of the invention. Words used herein are words of description rather than of limitation. It is, therefore, to be understood, that the appended claims are intended to cover all modifications which naturally flow from the foregoing description and examples.

The invention claimed is:

1. A method of providing a silent mode of operation for a hybrid electric vehicle having a rechargeable energy storage system (ESS), comprising the steps of:
   (1) transmitting a silent mode initiation request to a silent mode controller;
   (2) comparing an actual value of at least one state parameter of the ESS that is indicative of the availability of the ESS for implementing the silent mode to at least one silent mode initiation limit value associated with the actual value, wherein if the actual value of the at least one state parameter compared to the associated at least one mode initiation limit value indicates that the silent mode is allowed, the method proceeds to step (3), and wherein if the actual value of the at least one state parameter indicates that the silent mode is not allowed, step (2) is repeated so long as the silent mode initiation request is being transmitted;
   (3) transmitting a silent mode activation request to the silent mode controller;
   (4) operating the vehicle in the silent mode using the silent mode controller, comprising designating an electric drive motor as a primary source of propulsion energy for the vehicle and designating an engine as a secondary source of the propulsion energy for the vehicle, wherein a modal quantity of energy in the ESS is allocated for use by the electric drive motor during the silent mode and the engine is used to make up the difference between the modal quantity of energy and a total vehicle propulsion energy requirement during the silent mode;
   (4A) limiting an output power of the engine while the vehicle is in the silent mode to a silent mode output power limit that is less than a maximum output power of the engine, and,
   (5) terminating the silent mode in response to the occurrence of a mode termination event.

2. The method of claim 1, wherein the step of transmitting a silent mode initiation request is selected from the group consisting of: (a) manual transmitting of the silent mode initiation request by a vehicle operator, (b) automatic transmitting of the silent mode initiation request as a function of an absolute position of the vehicle, and (c) automatic transmitting of the silent mode initiation request as a function of a relative position of the vehicle to a region in which silent mode operation of the vehicle is desired.

3. The method of claim 1, comprising the further step of: (2A) precharging the ESS prior to initiation of a silent mode.

4. The method of claim 3, wherein the step of precharging the ESS comprises precharging the ESS to a state of charge (SOC) value that is less than or equal to a target precharge SOC limit.

5. The method of claim 4, wherein the target precharge SOC limit value is in the range of about 60–75 percent.

6. The method of claim 3, wherein the step of precharging the ESS comprises charging the ESS at a maximum charging power of the vehicle.

7. The method of claim 1, wherein the silent mode output power limit of the engine is automatically controlled as a function of a vehicle speed.

8. The method of claim 7, wherein the maximum silent mode output power limit of the engine is a function of an ESS budget factor, and wherein as the ESS budget factor decreases, the maximum silent mode output power limit is increased and the vehicle stop threshold value is decreased.

9. The method of claim 8, wherein the silent mode output power limit is zero at vehicle speeds that are less than a vehicle stop threshold value.

10. The method of claim 9, further comprising rotating the engine without fuel at vehicle speeds that are less than the vehicle stop threshold value.

11. The method of claim 10, further comprising stopping the rotation of the engine in response to an engine stop event.

12. The method of claim 11, further comprising starting the rotation of the engine in response to an engine start event.

13. A method of providing a silent mode of operation for a hybrid electric vehicle having a rechargeable battery, comprising the steps of:
   (1) transmitting a silent mode initiation request to a silent mode controller;
   (2) comparing a battery temperature to a mode initiation battery temperature limit value, wherein if the battery temperature is less than or equal to the mode initiation battery temperature limit value, the method proceeds to step (3), and wherein if the battery temperature is greater than the mode initiation battery temperature limit value, step (2) is repeated so long as the mode initiation request is being transmitted;

(3) precharging the battery prior to initiation of a silent mode;

(4) transmitting a silent mode activation request to the silent mode controller;

(5) operating the vehicle in the silent mode using the silent mode controller, comprising designating an electric drive motor as a primary source of propulsion energy for the vehicle and designating an engine as a secondary source of the propulsion energy for the vehicle, wherein a modal quantity of energy in the battery is allocated for use by the electric drive motor during the silent mode and the engine is used to make up the difference between the modal quantity of energy and a total vehicle propulsion energy requirement during the silent mode; and (6) terminating the silent mode in response to the occurrence of a mode termination event.

14. The method of claim 13, wherein the step of precharging the battery comprises precharging the battery to a state of charge (SOC) value that is less than or equal to a target precharge SOC limit.

15. The method of claim 13, comprising the further step of: (5A) limiting an output power of the engine while the vehicle is in the silent mode to a maximum silent mode output power limit that is less than a maximum output power of the engine.

16. The method of claim 13, wherein the maximum silent mode output power limit of the engine is a function of an ESS budget factor, wherein as the battery budget factor decreases, the maximum silent mode output power limit is increased.

17. The method of claim 13, wherein the mode termination event is selected from the group consisting of: (a) manual transmitting of a silent mode termination request by a vehicle operator, (b) automatic transmitting of a silent mode termination request as a function of the absolute position of the vehicle, (c) automatic transmitting of a silent mode termination request as a function of a relative position of the vehicle to a region in which silent mode operation of the vehicle is desired a manual mode termination command, (d) reaching a predetermined silent mode elapsed time limit, (e) reaching a predetermined silent mode elapsed distance limit, and (f) the battery temperature reaching a predetermined battery termination limit value, and (g) a battery SOC reaching a predetermined SOC termination limit value.

* * * * *